(No Model.)
R. P. SAFFOLD.
SULKY.
No. 599,257.  Patented Feb. 15, 1898.
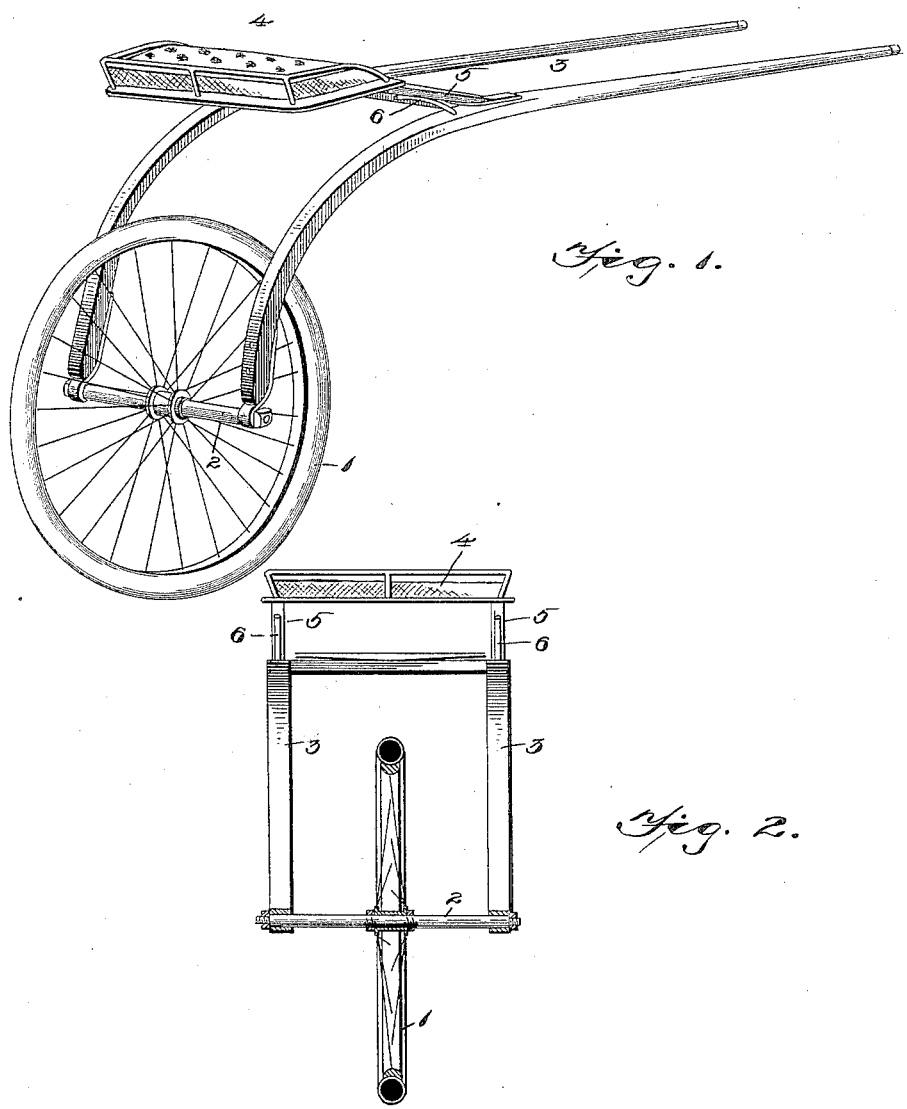
WITNESSES
F. L. Mockabee
C. D. Hesler
INVENTOR
Ray P. Saffold
By John Wedderburn
Attorney

United States Patent Office.

RAY P. SAFFOLD, OF SELMA, ALABAMA.

SULKY.

SPECIFICATION forming part of Letters Patent No. 599,257, dated February 15, 1898.

Application filed January 9, 1897. Serial No. 618,600. (No model.)

*To all whom it may concern:*

Be it known that I, RAY P. SAFFOLD, a citizen of the United States, residing at Selma, in the county of Dallas and State of Alabama, have invented certain new and useful Improvements in Sulkies; and I do hereby declare the following to be a full, clear, and exact description of the invention, such as will enable others skilled in the art to which it appertains to make and use the same.

This invention relates to improvements in sulkies and other vehicles of a similar nature.

The object of the invention is to provide a simpler, less expensive, and more rapid vehicle, wherein the number of wheels necessary for the proper traveling thereof shall be greatly reduced, and thereby facilitate movement of the vehicle along roads of various conditions, and, further, the invention aims to provide a vehicle which shall reduce liability of accident and consequent loss of life and property to a minimum.

With these objects in view the invention consists, substantially, in the construction, combination, and arrangement of parts, as will be hereinafter fully illustrated, described, and claimed.

In the accompanying drawings, Figure 1 is a perspective view of a vehicle constructed in accordance with the present invention. Fig. 2 is a transverse sectional view taken through the axle.

Similar numerals of reference designate corresponding parts throughout the figures of the drawings.

Referring to the drawings, 1 designates the carrying-wheel of the herein-described sulky, which wheel may be of any approved construction, and passing through said wheel is an axle 2, said axle being of sufficient length to project beyond each side of the wheel 1, so as to allow a pair of shafts 3 or their equivalent being attached to the ends of said axle. The shafts 3, as will be noted, have their rear curved ends secured to the elongated ends of the axle 2, and the wheel 1 is mounted upon the axle 2 at a point substantially midway the ends of the latter, the axle 2 being designed to remain in a rigid position in the curved ends of the shafts 3, while the wheel 1 is designed to freely rotate upon the axle 2 to enable the vehicle readily moving over the ground. If desired, the wheel 1 may be provided with ball-bearings of any suitable construction, so that the movement of said wheel on the axle 2 may be free in order that the amount of energy expended by the team drawing the vehicle may be reduced.

Mounted upon the shafts 3 is a seat 4, which seat is arranged, preferably, directly over the wheel 1, and for the purpose of holding said seat 4 above the wheel parallel supporting-arms 5 are secured to the seat 4 at their rear ends and have their forward ends suitably connected to the shafts 3 slightly in advance of the wheel. Spring-arms 6 are also secured to the shafts 3, adjacent to the connecting-points of the arms 5 with said shafts, and said arms extend rearwardly from said shafts and are adapted to have seated thereon the arms 5, by which the seat 4 is held above the wheel 1. The arms 6 provide for easy riding; but it will of course be understood that, if desired, any other form of springs may be employed, and hence I do not limit myself to the construction herein shown, nor do I wish to confine myself to the parallel arms 5 for supporting the seat 4 upon the shafts 3, as it is evident that the seat 4 may be supported upon the axle by any other suitable means or in any other desired position.

From the foregoing description it will be seen that I have provided a simpler and less expensive vehicle, which is highly desirable from the fact that the same is adapted for use in places where it would be impossible for a two-wheeled vehicle to pass, the single-wheel construction herein shown rendering it possible for greater speed to be made, and, furthermore, permitting the vehicle passing along the ground over which but a single horse or the like can travel. It is also apparent that liability to accident, which frequently occurs with the ordinary two-wheeled cart on rough ground, due to the cart being overturned by one wheel running upon a high place while the other is in a plane below, is effectually overcome, thus rendering the herein-described vehicle especially desirable. The axle 2 may project at any distance beyond the sides of the wheel 1, so as to permit the width of the vehicle being varied to allow the same being used for various purposes.

While the vehicle has been illustrated as in the form of a sulky, it is clearly obvious that the construction may be employed upon road carts and wagons of different descriptions, whereby the number of wheels heretofore necessary for the proper traveling of the vehicle may be reduced to a single one, and thus allow the vehicle passing over roads where it is impossible for those having two or more wheels to pass.

In the event that the construction herein described is applied to a wagon the seat 4 may be replaced by a body of suitable construction, so as to allow the vehicle being capable of transporting various articles, and the shafts 3 may be so constructed that the same shall be adapted for the hitching of two or more draft-animals, as desired, and the said shafts may also be formed of any approved size or shape.

Other changes in the form, proportion, and minor details of construction may be resorted to without departing from the spirit or sacrificing any of the advantages of this invention.

Having thus described my invention, what is claimed as new, and is desired to be secured by Letters Patent, is—

In a sulky of the character described the combination with the downwardly-curved shafts 3, of an axle 2 secured rigidly at the downwardly-curved ends of said shafts, a wheel mounted on said axle between the downwardly-extending ends of the shafts, rearwardly-extending arms 5 secured to the said shafts, a seat mounted on the rearwardly-extending ends of said arms, spring-arms 6 secured to the shafts beneath the said arms 5 and adapted to engage the latter, substantially as described.

In testimony whereof I have signed this specification in the presence of two subscribing witnesses.

RAY P. SAFFOLD.

Witnesses:
M. L. WORRELL,
H. A. HARALSON.